(12) United States Patent
Moretti

(10) Patent No.: US 8,459,501 B2
(45) Date of Patent: Jun. 11, 2013

(54) CONTAINER ASSOCIABLE WITH AIRLESS PUMPS AND METHOD FOR ITS PRODUCTION

(75) Inventor: Matteo Moretti, Crema (IT)

(73) Assignee: LUMSON S.p.A., Capergnanica (IT)

( * ) Notice: Subject to any disclaimer, the term of this patent is extended or adjusted under 35 U.S.C. 154(b) by 384 days.

(21) Appl. No.: 12/829,771

(22) Filed: Jul. 2, 2010

(65) Prior Publication Data

US 2011/0024380 A1 Feb. 3, 2011

(30) Foreign Application Priority Data

Jul. 30, 2009 (IT) .............................. MI2009A1371

(51) Int. Cl.
*B29C 49/00* (2006.01)

(52) U.S. Cl.
USPC .............. 222/1; 222/95; 222/105; 222/386.5; 428/36.91

(58) Field of Classification Search
USPC ................ 222/1, 95, 105, 94, 96, 386, 386.5; 428/36.91
See application file for complete search history.

(56) References Cited

U.S. PATENT DOCUMENTS

| | | | | |
|---|---|---|---|---|
| 3,784,039 A | * | 1/1974 | Marco | 215/11.3 |
| 2004/0043168 A1 | * | 3/2004 | Ishikawa et al. | 428/35.7 |
| 2004/0112921 A1 | | 6/2004 | Nomoto et al. | |
| 2008/0260978 A1 | * | 10/2008 | Van Hove et al. | 428/35.7 |
| 2010/0276447 A1 | * | 11/2010 | Patrini | 222/105 |

FOREIGN PATENT DOCUMENTS

| | | |
|---|---|---|
| JP | 2000-158519 | 6/2000 |
| WO | WO 2009/047021 A1 | 4/2009 |

OTHER PUBLICATIONS

U.S. Appl. No. 12/844,400, filed Jul. 27, 2010, Moretti.
Extended European Search Report issued Aug. 13, 2010 in European Application No. EP 10 16 7732.6—1253.

* cited by examiner

*Primary Examiner* — J. Casimer Jacyna
(74) *Attorney, Agent, or Firm* — Oblon, Spivak, McClelland, Maier & Neustadt, L.L.P.

(57) ABSTRACT

A container comprising a rigid body (5) having a neck (6) defining an aperture providing access to the container cavity and a bag (9) positioned in the interior of the body (5), the bag being formed of thermoplastic material and having a neck (2) from which there radially extends a flange (3) which rests on a free edge of the neck (6) of the body (5) and defines a hole for providing access to the cavity of the bag (9) and for sealedly housing the body of a hermetic pump (P) operable manually to withdraw the fluid substance (F) from the bag and feed it to the outside through its dispensing stem (S), the bag being formed by hot blow molding of a preform placed directly within the container, a lubricant fluid being disposed between said container and said bag.

7 Claims, 3 Drawing Sheets

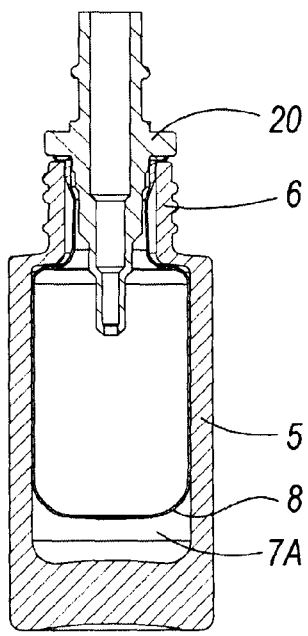
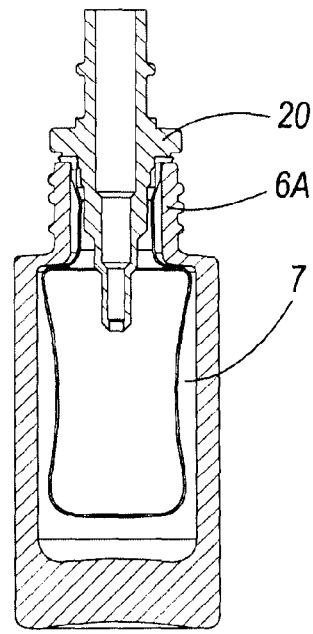
*Fig. 4*  *Fig. 5*
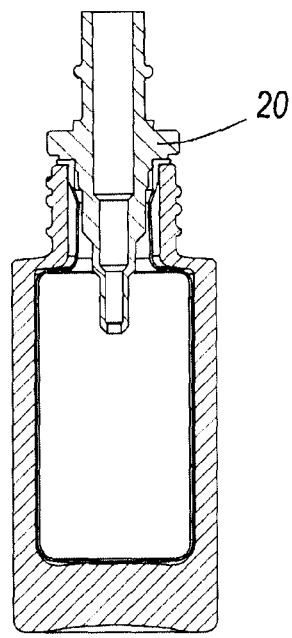
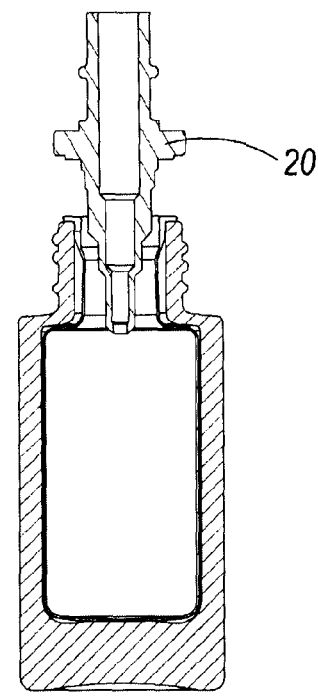
*Fig. 6*  *Fig. 7*

CONTAINER ASSOCIABLE WITH AIRLESS PUMPS AND METHOD FOR ITS PRODUCTION

TECHNICAL FIELD

The present invention relates to a container associable with a manually operable pump for dispensing fluid substances contained under airtight conditions in a deformable bag housed in a rigid body.

BACKGROUND

It is known to enclose fluid substances (both liquid and creamy) in containers from which these substances are dispensed by manually operating a small pump mounted on the mouth of a respective container. Pump operation causes a quantity of fluid substance to be withdrawn from the container in which—if the container is rigid—a vacuum forms which would prevent further substance withdrawal and dispensing, if air were not allowed to enter the container (which generally takes place in those regions in which the pump makes contact with and slides on the pump body), or if the container did not comprise a base sealedly movable along an internal cylindrical surface of the container (see for example U.S. Pat. No. 4,691,847, U.S. Pat. No. 4,694,977 and U.S. Pat. No. 5,971,224): this latter system for compensating the container volume by reducing its internal volume while maintaining the internal pressure constant is however very laborious and costly.

In many cases it is opportune or necessary that the fluid substance to be dispensed by a pump never comes into contact with the atmosphere inside the container (with the dispensing pump mounted on it): sealing the fluid out of contact with the atmosphere is important if the composition of the fluid within the container is not to undergo alteration, or if it is essential that the fluid substance enclosed in the container remains sterile. To achieve this, U.S. Pat. No. 3,420,413 has proposed a device comprising a bag containing the fluid substance which is to remain isolated (from the atmosphere) inside the bag which (see column 4, lines 22-28) is made of elastically deformable flexible material and has a neck on which a support element (having a profiled aperture for housing a pump) is sealedly applied after the bag has been filled with the fluid substance to be dispensed: after this, a pump is sealedly mounted on said support element to hence prevent contamination of the fluid substance by the air (column 5, lines 15-38). The bag containing the fluid substance and having the pump sealedly mounted on its neck is then inserted into a rigid body (obviously being very careful that the free end of the rigid body does not come into contact with the bag filled with fluid substance, in order not to break it) on which said support element is then positioned and fixed (column 5, lines 56-61). Hence between the outer surface of the bag and the inner surface of the rigid body an interspace is formed which is connected to atmosphere via a hole provided in the container base; in this manner, when the fluid substance is withdrawn from the bag by operating the pump, the bag is squeezed by the atmospheric pressure so that the substance can be easily withdrawn and expelled to the outside by the pump (column 5, lines 70-73). The main drawback of the aforesaid device is that the deformable bag must be filled with fluid substance before the bag is inserted into the respective rigid container, and that the operation involved in inserting the bag into the container is very delicate because the bag can be easily torn while being inserted into the container interior.

JP 05 031790A and JP 05 031791A published on Sep. 2, 1993 describe how a bag of elastically deformable material can be produced directly within a rigid container. For this purpose an elongated preform (made of thermoplastic material and having an elongated hollow cylindrical body, open at one end where the preform presents a neck from which a flange radially projects) is inserted into a rigid container having a mouth from which a neck extends, on the free edge of which there rests the flange of the preform, which is heated, thrust towards the container base by a pusher and then inflated within the container, until a bag forms, the outer surface of which adheres (at least for a large part of its surface) to the inner surface of the container. The bag obtained in this manner also has a neck, at least an end portion of which presents outwardly projecting longitudinal ribs, with some radial ribs or projections projecting from that surface of the preform flange which faces the free edge of the neck of the container in which the bag is inserted: these ribs or projections define passages for the air which penetrates from the outside between the container and bag to enable this latter to flatten or inwardly deform during outward dispensing of the fluid substance through the pump, so preventing the formation inside the bag of a vacuum which would prevent dispensing of the fluid substance.

In particular, in the two Japanese patents the method used to inflate the bag within the container imposes considerable stresses on the bag, which can break it both during inflation and during use.

WO-A-2009047021 and JP-A-2000158519 describe containers known in the prior art.

This is substantially due to the fact that the production method causes the bag to adhere, at least in some points, to that part of the cavity within which it is inflated.

SUMMARY

The main object of the present invention is therefore to provide a device of the stated type in which the respective deformable bag is less subject to rupture during the inflation step and perfectly occupies the entire volume of the cavity within which it is inflated.

These and other objects are attained by a device in accordance with the technical teachings of the accompanying claims.

BRIEF DESCRIPTION OF THE DRAWINGS

The ensuing description provides a non-exclusive embodiment of the device, which is indicated by way of non-limiting example; it is represented with the aid of the accompanying drawings, in which.

FIGS. from 1 to 7 represent in section the various steps of the process by which the container is produced.

DETAILED DESCRIPTION

Figure 1:
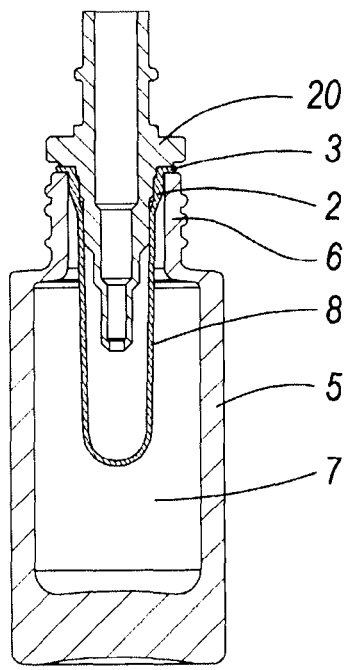

Reference will firstly be made to FIG. 1 which represents a first step of the method of the present invention.

Initially an external rigid body 5 is provided having a neck 6 defining an aperture giving access to the body cavity 7. The neck presents an external thread 6A used to screw down a hermetic pump (by means of a ring cap) as described hereinafter.

The body 5 is formed preferably of transparent material, such as transparent plastic or glass.

A preform 8 is provided, formed by moulding a plastic material, such as PE, PET, PP or the like, or by co-injection moulding various layers of mutually different materials. The preform 8 comprises a lowerly rounded elongated body. It also comprises a neck 2 from which a flange 3 radially extends. Teeth (not shown), the use of which is clarified hereinafter, extend from the outer part of the neck.

The transverse body dimensions of the preform 8 are such that it can be freely inserted into the rigid body 5, while the preform neck 2 is profiled and has dimensions such that it easily penetrates into the hole in the neck 6 of the body 5, with the free ends of the teeth being substantially in contact with the inner surface of the hole in the neck 6, and the projecting flange 3 of the preform resting on the end of the neck 6 but without sealedly adhering to it because spaced-apart radial ribs or projections (also not shown) project from the lower surface (with respect to FIG. 1) of the flange 3.

In this manner, free passages form between the flange 3 of the preform neck and the end edge of the container neck 6, whereas other free passages also form (between each tooth 4 and the tooth adjacent to it) between the outer surface of the preform neck 2 and the inner surface of the hole in the neck 6 of the rigid body 5.

Essentially, the chamber 7 is in free communication with the outside. The preform is heated to a temperature sufficient to soften (plasticize) the plastic material forming the preform. In the present method it is heated, by way of example, to a temperature of 120° C. for a time between 4 and 7 seconds.

Once heated, it is inserted into the body 5 to hence obtain a situation such as that of FIG. 1. Specifically, the preform flange 3 rests on the edge of the neck 6 of the body 5. As can be seen from the figure, a nozzle 20 is inserted into the preform and is sealedly connected to the neck 2 of the preform 8. The sealed connection is made in known manner.

A first air jet is then fed into the preform to inflate the preform 8 such as to form a bag 8 (indicated by the same reference numeral as the preform) which at least partially occupies said body cavity. The inflating air or fluid fed into the preform interior has a pressure between 2 and 10 bar, depending on the preform thickness, preferably 3 bar. The air jet feed into the preform lasts for about 0.5-1 second. The jet air is at ambient temperature, but can also be hotter depending on requirements.

Specifically, feeding air into the preform causes the bag to inflate so that it adheres to the walls defining the cavity 7. The bag swells until the pressure of the air trapped within the interspace which forms between the bag and the walls of the cavity 7 reaches a value equal to the pressure of the air fed into the preform. In this respect, the sudden adhesion of the newly formed bag against the sides of the cavity 7, in proximity to the aperture, creates a seal which prevents the air present in this interspace from escaping. The inflation of the bag is hence only partial.

In the known art, the bag is maintained under pressure while the air present in the interspace is allowed to seep from some part towards the container neck, much higher inflation pressures being used to accelerate air seepage.

In contrast, according to the present invention, the initial air jet is interrupted to nullify (i.e. by making it equal to the external pressure) the pressure within the bag. The compressed air present in the interspace 7A hence squashes the bag to separate it from the walls defining the cavity, and seeps upwards to emerge from the neck.

This procedure causes the bag to substantially separate from the container inner walls. Essentially, any hypothetical adhesion between the bag and the walls defining the cavity, due for example to the temperature of the plastic material and to a sort of "gluing effect", is prevented. It should be noted that such an at least partial adhesion would have been not only possible but indeed probable, and damaging for the integrity of the bag.

After the time required to squash the bag and for the air to escape from the interspace 7A has passed (about 0.5-1 second), a further air jet is fed into the bag (FIG. 4).

Figure 3:
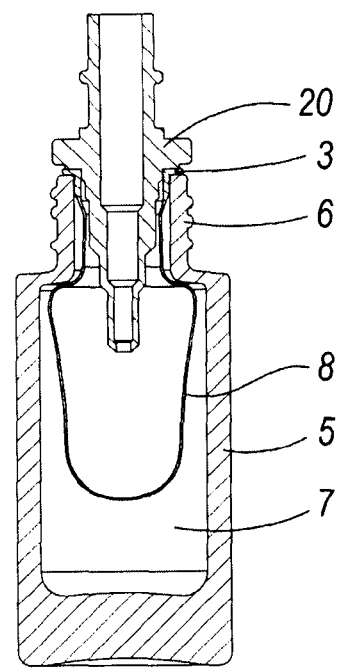

This time the bag 8 fills the cavity 7 to a greater extent (FIG. 4). In this respect, the air remained trapped within the interspace 7A has an initial volume less than that present between the preform and the cavity walls during the preceding step. This is because at the moment the air jet is fed (FIG. 3), the bag occupies a greater cavity volume than the preform.

As in the previous case, this further air jet is maintained for a time between 0.5 and 1 second. It is then halted, the bag is deflated, the compressed air present in the interspace 7A escapes upwards, and the condition of FIG. 5 is achieved. In this situation the bag has almost completely filled the cavity.

Figure 2:
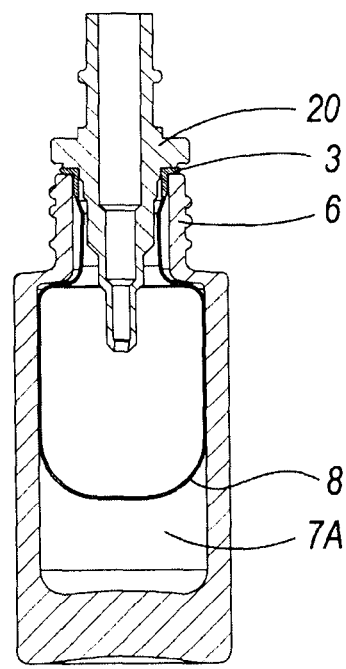
Figure 8:
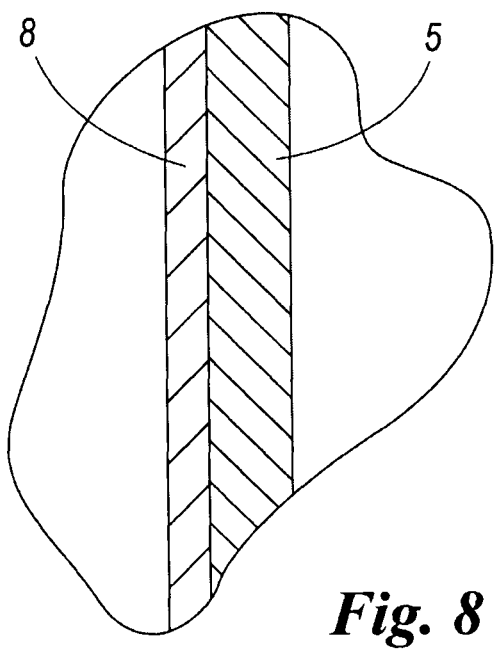
FIG. 8 and FIG. 9 show respectively an enlarged detail of FIGS. 6 and 7.

At this point a final air jet is fed to completely inflate the bag, as shown in FIG. 6. In this respect, the air surrounding the bag and trapped between this latter and the walls defining the cavity is very meagre. In the step shown in FIG. 6 the jet is maintained for a slightly longer time than for the preceding steps. This enables the small amount of air remaining in the interspace to escape. FIG. 8 shows an enlargement of the situation prevailing in this step, and in the steps shown in FIGS. 2 and 4. The bag is in contact with the wall defining the cavity of the container 5.

On termination of this latter step the jet is halted and the nozzle 20 is extracted. The bag cools at this point and undergoes slight shrinkage due to thermal contraction, which causes it to separate in a substantially uniform manner from the walls defining the container cavity.

Figure 9:
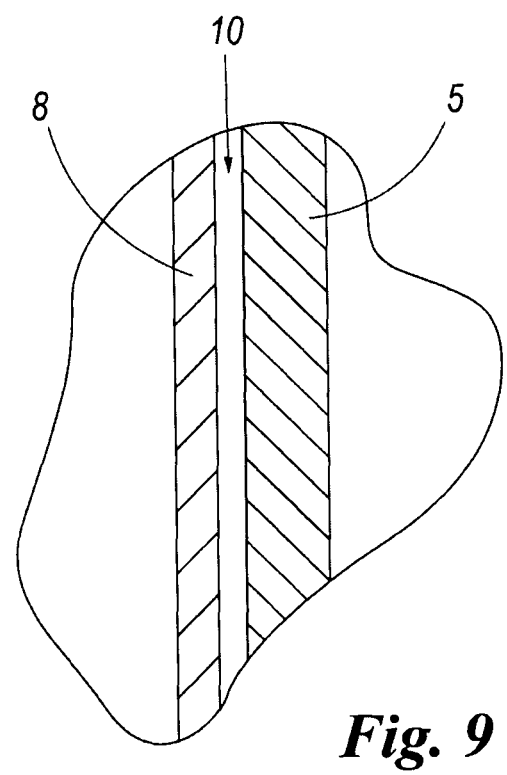

FIG. 9 is an enlargement of a detail of FIG. 7. The situation herein shows a uniform interspace 10 surrounding the entire bag, especially in the lateral region.

A bag inflation method has been described and illustrated comprising three inflation stages. Essentially three successive jets are fed, spaced apart by suitable pauses. This cycle lasts about 7 seconds for a vessel of 30 ml.

More successive jets may be required, depending on the container and bag dimensions. Essentially, the air injection step and the subsequent jet interruption to enable venting of the air situated in the interspace outside the bag can be repeated as many times as required.

However at least one air venting step has to be provided, and hence at least one interruption in the air jet for inflating the bag.

Thus, at least two inflation jets will be necessary, between the two jets a pause or interruption of the jets being provided.

It should be noted that the successive air jets fed into the bag can have a constant pressure (for example 3 bar as indicated above), or can have a pressure which varies depending on the current inflation step. For example the first jet fed into the bag can have a lower pressure than the final maintaining jet, or vice versa. Consequently pressure regulation can be optimized, even with differences between one jet and the next, to obtain maximum possible uniformity of bag thickness.

The bag formed in the container interior has a substantially uniform thickness, in contrast to that of the methods of the known art. The bag thickness is between 0.1 and 0.4 mm, preferably 0.2 mm, and is particularly uniform, especially in the lateral (vertical) portion of the bag, i.e. that between the base and the top of the bag, where the neck is present.

Using the methods described in the known art, the bag would present a lateral portion which is thinner towards the top, but thicker towards the bottom. This non-uniformity, due to the "stretching" caused in the initial step by the nozzle, can result in bag tearing during inflation or during its filling with the product to be dispensed.

Moreover in the present solution the bag is detached from the walls of the container cavity, in the sense that an interspace exists which is substantially uniform at least between the lateral wall of the bag and the cavity walls, which facilitates air passage during the use of the pump.

Moreover there are no regions or portions in which the bag adheres to the cavity wall. This is ensured by the "pulse" inflation method which enables the bag to separate (possibly due to the bag/preform temperature) by shrinkage and by the effect of the air trapped within the interspace by the bag inflation.

To complete the description, it should be noted that the user receiving the container 5 with the bag 9 already inserted and retained in it introduces into the bag (through the aperture in its neck 2) the desired quantity of fluid substance, which can fill the bag as far as its neck 2. The said user then inserts into the bag 9, through the aperture in its neck, a manually operable pump having a dispensing stem (which projects to the outside of the bag 9 and of the container 5) and a dip tube which is immersed in the fluid substance contained in the bag.

The pump P is then locked securely onto the neck 6 of the container in known manner, for example by a ring cap N having an internal thread which is screwed onto threads or helical ribs 6A projecting from the outside of the container neck 6.

The ring cap N rests on the upper surface of a collar which projects radially from the pump body and presses it into sealed contact with the flange 3 of the neck 2 of the bag 9, hence pressing the lower part of the pump into the cavity of the bag neck 2 where it forms a seal, this seal being further improved by an elastic ring positioned immediately below the collar.

The container 5 can evidently be made of any rigid or substantially rigid material (in addition to glass), for example of aluminium or other metal, or of rigid plastic.

In all cases, for correct pump operation it is important that the interspace 10 be in contact with the external environment, for example via the described passages formed between the container neck and the bag neck, below the flange.

One or more holes for air passage can however be provided in the container, as illustrated in U.S. Pat. No. 3,420,413 and U.S. 2004/0112921 A1, in any position therein.

Advantageously, the bag presents means (i.e. the flange 3) for connection to a ring cap for fixing said pump to said container. These means, for example, engage the ring cap thread and enable the bag to be extracted from the body 5 during removal of the ring cap (and hence of the pump) from the container.

According to the present invention, there is absolutely no need for inflation to take place in two separate steps between which the air jet into the preform/bag is interrupted, however it is essential that a lubricant fluid is disposed between the outer surface of the preform and the walls defining said cavity, to facilitate sliding of the bag wall along the walls defining the cavity during the inflation step.

Specifically, in a step preceding blowing, a solution comprising a lubricant fluid is sprayed into the container 5. This facilitates stretch-blowing of the bag. If the lubricant is non-volatile, the presence of the lubricant also facilitates the next step of extracting the empty bag when its use is terminated.

The lubricant/sliding agent preferably comprises a silicone-based solution which is sprayed into the container for example by two methods.

In a first method, a uniform neutral coloured solution of lubricant fluid is sprayed into the container 5 in a station preceding the bag blowing station, directly in the machine. This station evidently precedes that in which the hot preform is inserted into the container 5.

In a second method, the lubricant solution or the lubricant itself is added to a coloured or neutral varnish (water based varnishes, solvent varnishes) with a concentration not exceeding 3%. The varnish is sprayed as decoration into the container (preferably of glass) in a step preceding blowing. Advantageously in this embodiment the non-volatile lubricant which remains incorporated in the varnish provides a valid aid to the withdrawal of the empty bag from the container, on termination of its use.

With both methods, an atomizing spray gun is required, with its diameter less than the container mouth, to enable the nozzle to enter the bottle.

The gun has a nozzle with holes allowing spray through 360° (this type of gun is already available commercially).

The movement of the gun along its vertical axis during its entry and exit, combined with the rotation of the gun during spraying, enables the sliding solution and consequently the decoration to be distributed uniformly and homogeneously.

The lubricant can be a silicone elastomer (silicone, or silicone rubber) or a polyolefin or a hydrogenated polyolefin. In this case, the lubricant should be heated up to its melting point in order to make it fluid.

The lubricant can be used pure or added to a base and is sprayed homogeneously on the glass surface.

In the second method the base corresponds to varnish and forms the interior decoration.

As this lubricant has a low degree of volatility it remains inside the container even after blowing, and hence facilitates subsequent separation of the bag from the container once the bag contents are depleted.

The invention claimed is:

1. A container production method, comprising the steps of:
providing an external rigid body having a neck defining an aperture giving access to a cavity of said body;
providing a preform formed of thermoplastic material, the preform including a neck from which a flange radially extends;
heating the preform above a softening point of the thermoplastic material;
arranging the preform in the aperture of the body such that said flange rests on a free edge of the neck of the body;
feeding into an interior of the preform a first air jet which inflates the preform to form a bag which at least partially occupies said body cavity, said bag having walls that are urged into contact with walls defining said body cavity;
disposing, at least during the feeding step, a lubricant fluid between an external surface of the preform and the walls defining said body cavity, to facilitate sliding of the bag walls along the walls defining said body cavity; and
spraying said lubricant fluid on the walls defining said body cavity before inserting the preform into said body cavity.

2. The method as claimed in claim 1, further comprising performing, after feeding said first air jet into the preform interior, the following steps:
interrupting said first air jet to enable said thermoplastic material to shrink, with consequent detachment of said thermoplastic material from the walls defining said body cavity, to allow outflow of air compressed by expansion of the bag and trapped between the bag and the walls defining said body cavity;

blowing into the bag a final air jet, said final air jet completely inflating the bag so as to cause the bag to come into contact substantially with every point of at least an inner lateral surface of said body cavity; and interrupting the final air jet to facilitate slight shrinkage of the bag which at least partially separates the bag from the walls defining said body cavity.

3. The method as claimed in claim 2, wherein after interrupting the first air jet and while awaiting bag shrinkage, feeding a further air jet into the preform interior to further inflate the bag such that the bag occupies said body cavity to an even greater extent, the bag walls being urged into contact with the walls defining said body cavity, and then interrupting said further air jet to enable said thermoplastic material to shrink, with consequent detachment of said thermoplastic material from the walls defining said body cavity, to enable a further outflow of the air compressed by the bag expansion and trapped between the bag and the walls defining said body cavity.

4. The method as claimed in claim 3, wherein the steps of feeding said further air jet into the perform interior to further inflate the bag and interrupting said further air jet to enable said thermoplastic material to shrink of claim 4 are repeated until the bag almost completely occupies said body cavity during said further jet feed.

5. The method as claimed in claim 1, wherein said lubricant fluid is silicone-based.

6. The method as claimed in claim 1, wherein said lubricant fluid is added to a coloured or neutral varnish arranged to coat the interior of the container.

7. The method as claimed in claim 1, wherein said lubricant fluid is one chosen from the following group: silicone elastomer, polyolefin, and hydrogenated polyolefin.

* * * * *